United States Patent [19]

Fitzgerald et al.

[11] Patent Number: 5,253,249
[45] Date of Patent: Oct. 12, 1993

[54] BIDIRECTIONAL TRANSCEIVER FOR HIGH SPEED DATA SYSTEM

[75] Inventors: John J. Fitzgerald, Leominster; Donald G. Shuda, Chelmsford, both of Mass.

[73] Assignee: Digital Equipment Corporation, Maynard, Mass.

[21] Appl. No.: 374,046

[22] Filed: Jun. 29, 1989

[51] Int. Cl.⁵ ............................................. H04B 1/56
[52] U.S. Cl. ........................................ 370/24; 375/7; 379/406; 379/395; 359/113
[58] Field of Search ................ 370/28, 24, 27, 32.1, 370/32; 330/288; 379/406, 410, 411, 405, 395, 404, 394, 393; 375/7, 8, 11; 359/113, 152, 153, 122; 333/28 R

[56] References Cited

U.S. PATENT DOCUMENTS

| | | | |
|---|---|---|---|
| 3,725,582 | 4/1973 | Davis | 370/28 |
| 3,730,993 | 5/1973 | Moriyasu | 178/59 |
| 3,973,089 | 8/1976 | Puckette | 379/404 |
| 4,162,371 | 7/1979 | Belforte | 178/58 R |
| 4,393,494 | 7/1983 | Belforte et al. | 370/27 |
| 4,560,920 | 12/1985 | Okanobu | 330/288 |
| 4,698,800 | 10/1987 | Cavallere et al. | 370/24 |

FOREIGN PATENT DOCUMENTS

| | | | |
|---|---|---|---|
| 1762729 | 8/1968 | Fed. Rep. of Germany | |
| 2801469 | 7/1978 | Fed. Rep. of Germany | 370/24 |
| 1167485 | 3/1968 | United Kingdom | |

Primary Examiner—Douglas W. Olms
Assistant Examiner—Dang Ton
Attorney, Agent, or Firm—Arnold, White & Durkee

[57] ABSTRACT

A transceiver circuit for use in a high speed data transmission network is disclosed that provides for simultaneous bidirectional transmission of data over coaxial or twisted pair media. A transmitter circuit provides an output data signal to a bridge network. The bridge network develops a cancelling signal and a combined signal. A receiver section includes a high speed subtracting circuit that determines the difference between the cancelling signal and the combined signal to effectively cancel data supplied by the transmitter section.

4 Claims, 3 Drawing Sheets

BIDIRECTIONAL TRANSCEIVER FOR HIGH SPEED DATA SYSTEM

The invention relates to a bidirectional transceiver for use in a high speed data transmission system. More particularly, the invention provides an alternative to fiber optic interface components for transcarrying fiber distributed data via coaxial or twisted pair media.

BACKGROUND OF THE INVENTION

With the availability of increased data processing capability and mass storage systems, it is imperative that data communication links transfer large amounts of data at significantly increased rates. The Fiber Distributed Data Interface (FDDI) provides a standard for high speed fiber optic data communication used in local area network applications as a high performance interconnection among mainframe computers, their mass storage sub-systems and other peripheral digital devices. According to the FDDI standard as defined by the American National Standards Institute, data traffic on the high speed network may approach data transmission rates of approximately 125 Megabits per second. The standard also requires a Bit Error rate of $2.5 \times 10^{-10}$ which corresponds to a signal to noise ratio of about 6:1.

To accomplish accurate and reliable data transmission at FDDI specified data rates, FDDI compatible fiber optic components currently provide the data transmission media. While such components operate accurately and effectively, implementation of the fiber optic transmission network is costly. This cost is magnified in an office environment where numerous workstations and other digital devices are located within a relatively local geographical area. In many applications, the higher speed fiber optic network replaces an existing lower speed network operating over a coaxial or twisted pair media. Thus, the cost of implementing the fiber optic network includes the removal of the already existing network.

It is therefore desirable to provide a less expensive option to the high cost fiber optic components comprising the transmission system particularly for shorter data links. It has been found that coaxial components provide a cost savings on the order of twenty to one in comparison with optical components. Moreover, it is advantageous to implement an FDDI network using an already installed coaxial media to upgrade existing networks designed to operate at lower data rates. It is also desirable to use twisted pair media in an FDDI network as a cost saving alternative and for maximum flexibility.

The use of a single coaxial media for bidirectional data transmission is known for application at lower frequencies, for example in telephonic or voice communication. However, significant constraints on these devices prohibit transmission over coaxial media in conformance with the FDDI standard. The use of twisted pair media as the transmission medium for FDDI data communication is likewise heretofore unknown.

Collision detection is another approach to bidirectional transmission. This approach involves biasing packets of data at a predetermined DC voltage level. The simultaneous transmission of two or more packets creates an increased DC voltage level. The collision detection approach, however, requires additional collision handling algorithms that are time consuming and do not conform with the FDDI standard. Therefore, a need exists to provide a transmission media for FDDI data at a lower cost yet conforms to the requirements of the FDDI standard.

SUMMARY OF THE INVENTION

The present invention provides inexpensive circuitry for using a single coaxial conductor or twisted pairs of wires in place of two fiber optic cables for interoperation in a Fiber Distributed Data Interface data communication network operating at high speeds. The invention operates reliably over distances typically less than 100 meters at frequencies of 125 megabits per second by separating supplied data signals from received data signals when both occur simultaneously over the transmission medium.

According to one embodiment of the invention, a transceiver circuit for simultaneously receiving and supplying data over a coaxial conductor in a high speed transmission network includes a transmitter section for supplying a transmitted data signal. An impedance bridge network receives the transmitted data signal and a received signal and provides a cancelling signal output having a component of the transmitted data signal. The impedance network also provides a combined signal output including a component of the transmitted signal and the received signal. A receiver section including a high speed subtracting circuit, preferably including a subtracting transistor, receives the cancelling signal output and the combined signal output and provides the received data signal as an output.

Preferably, the transceiver circuit also includes a first equalizing circuit that receives the transmitted data signal from the transmitter section to provide an equalized transmitted data signal to the impedance network. A second equalizing circuit receives the received data signal from the high speed subtracting circuit to provide an equalized data signal.

DESCRIPTION OF PREFERRED EMBODIMENTS

The present invention provides a low cost alternative for Fiber Distributed Data Interface (FDDI) data transmission applications in a high speed data processing network with use of a single coaxial cable or twisted pair media. According to the invention, a bidirectional transceiver is disclosed that combines supplied high speed data signals with received high speed data signals when both occur simultaneously over the coaxial transcarrying media. The invention operates efficiently and reliably over a limited distance of coaxial cable and in an alternative embodiment, provides an interface for transmission over twisted pair media. Data may thereby be transmitted using fiber optic components or be transmitted over coaxial or twisted pair media on the high speed network.

Figure 1:
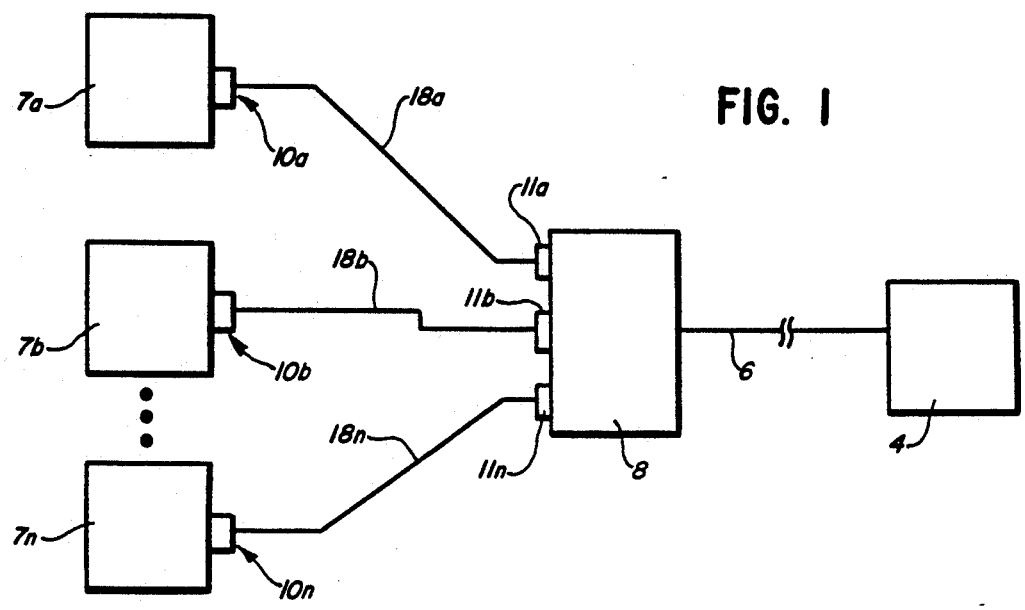
FIG. 1 is a block diagram representation of a bidirectional transceiver in accord with the present invention in place in a Fiber Distributed Data Interface local area network.

Turning now to the drawings, FIG. 1 shows a high speed Fiber Distributed Data Interface (FDDI) network which operates at a data rate of approximately 125 Megabits per second. The network may be used in a typical office environment that is characterized by the proliferation of network nodes or workstations, shown as workstations 7a through 7n. Each bidirectional transceiver 10a through 10n embodying the present invention is connected to the respective workstations 7a through 7n. Each transceiver 10 allows the bidirectional transmission of data over a respective data transmission media such as coaxial cable 18a through 18n which is interconnected with a respective second bidirectional transceiver 11a through 11n and provides an interface with a wiring concentrator 8. Wiring concentrator 8 is a hub node for connection of several work stations as is well known in the field, and may, for example, operate to simultaneously receive data from and supply data to a mainframe computer 4 or other device over a fiber optic medium 6 to form part of an FDDI token ring. Wiring concentrator 8 also provides an interface between optical waves transmitted over the fiber optic medium 6 and electrical signals transmitted over the coaxial cables 18a through 18n.

Due to noise levels generated over the transmission media and the attenuation and distortion of transmitted signals over longer lengths of conductors, the present invention is limited to media dependent distances of approximately 100 meters. However, it must be emphasized that the term short distances is relative and distances over 100 meters may be used in other applications. The transceivers 10 and 11 provide an inexpensive alternative to the fiber optic componentry for shorter data links. Further, transceivers 10 and 11 may enable the use of already installed cable such as coaxial cable 18 in networks upgraded to run at higher speeds.

Figure 2:
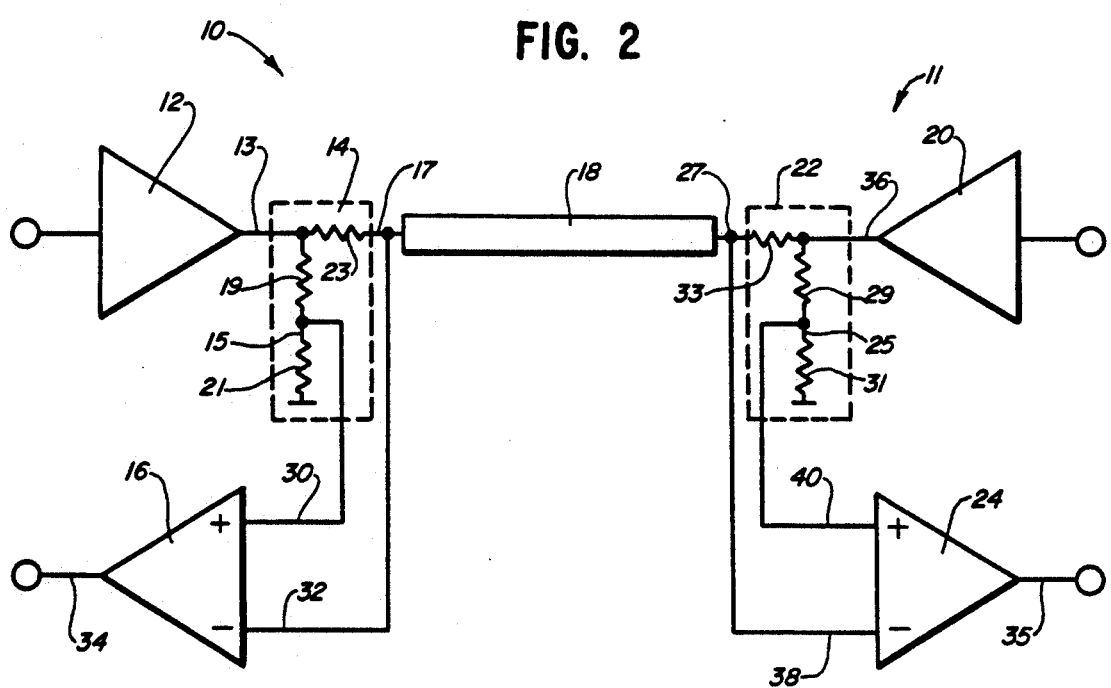
FIG. 2 is a block diagram representation of the elements included in a pair of bidirectional transceivers shown in FIG. 1.

Referring now to FIG. 2 therein is shown a block diagram representation of a first coaxial transceiver 10, a coaxial data carrying cable 18, and a second coaxial transceiver 11. FIG. 2 illustrates one transceiver combination corresponding to each of the bidirectional transceivers 10a through 10n, coaxial cables 18a through 18n and the second bidirectional transceivers 11a through 11n shown in FIG. 1. Coaxial transceiver 10 includes a first transmitter 12, a first bridge network 14, and a first receiver 16. Transceiver 10 is coupled with a second coaxial transceiver 11 via a coaxial signal carrying conductor or cable 18. Second coaxial transceiver 11 includes a second transmitter 20, a second bridge network 22, and a second receiver 24.

The first bridge network 14 is coupled with an output terminal 13 of the first transmitter section 12. The first bridge network 14 includes a first branch 15 comprising resistors 19 and 21 and a second branch 17 comprising a resistor 23 and the transmission line impedance of coaxial cable 18. The values of resistors 19, 21 and 23 are chosen to be substantially the same as the transmission line impedance of coaxial cable 18. The first bridge network 14 applies the signal at the output terminal 13 of first transmitter section 12 across legs 15 and 17. A signal equal to one half of the transmitter section output signal at terminal 13 provides a cancelling signal to one input terminal 30 of the first receiver section. Similarly, a signal equal to one half of the transmitter section output signal at terminal 13 provides one component of a combined signal at input terminal 32 of the first receiver section. The first receiver section 16 subtracts the cancelling signal at terminal 30 from the combined signal at terminal 32 to provide an output at terminal 34. A data signal supplied by the first transmitter section 12 is thereby effectively canceled at the output terminal 34 of the first receiver section 16. This signal will appear at output terminal 34 of first receiver section 16 as a null voltage.

A data signal supplied at the output terminal 36 of the second transmitter section 20 of transceiver 11 will likewise be applied to a second bridge network 22. As with the first bridge network 14, the second bridge network 22 includes a first branch 25 comprising resistors 29 and 31 and a second branch 27 comprising a resistor 33 and the transmission line impedance of coaxial cable 18. The second bridge network applies the data signal supplied at the output terminal 36 from second transmitter section 20 across legs 25 and 27, providing a signal equal to one half of the second transmitter output signal to first and second input terminals of the second receiver section 24. The output of the second receiver section 24 provides an output voltage equal to the difference of the input signals received at terminals 38 and 40.

The portion of the signal supplied by the second transmitter section 20 to bridge network 14 encounters a terminating impedance approximately equivalent to the value of the resistance of resistor 23 since the first transmitter section 12 appears as a low impedance. This signal is thereafter combined with the signal supplied by the first transmitter 12 to provide the combined signal at input terminal 32 to the first receiver section 16. When first transmitter section 12 and second transmitter section 20 simultaneously transmit data, the first receiver section 16 subtracts the cancelling signal appearing at input terminal 30 of first receiver section 16 from the combined signal appearing at input terminal 32 representing one half of the signal transmitted by first transmitter section 12 and the received signal transmitted by second transmitter section 20. The receiver section amplifies the difference between the signals by two and provides a resulting signal at line 34 equivalent to the signal transmitted by the second transmitter 20.

Likewise, the resulting signal on line 35 of the second receiver section 24 is an amplification of the difference of the cancelling signal supplied by the second transmitter section to input terminal 40 and the combined signal supplied by the first transmitter section 12 and the second transmitter section 20. Therefore, when the first transmitter 12 and second transmitter 20 are simultaneously transmitting data, the data supplied by the first receiver section 16 corresponds to the data supplied by the second transmitter 20 and the data supplied by the second receiver section 24 corresponds to the data supplied by the first transmitter 12.

Figure 3:
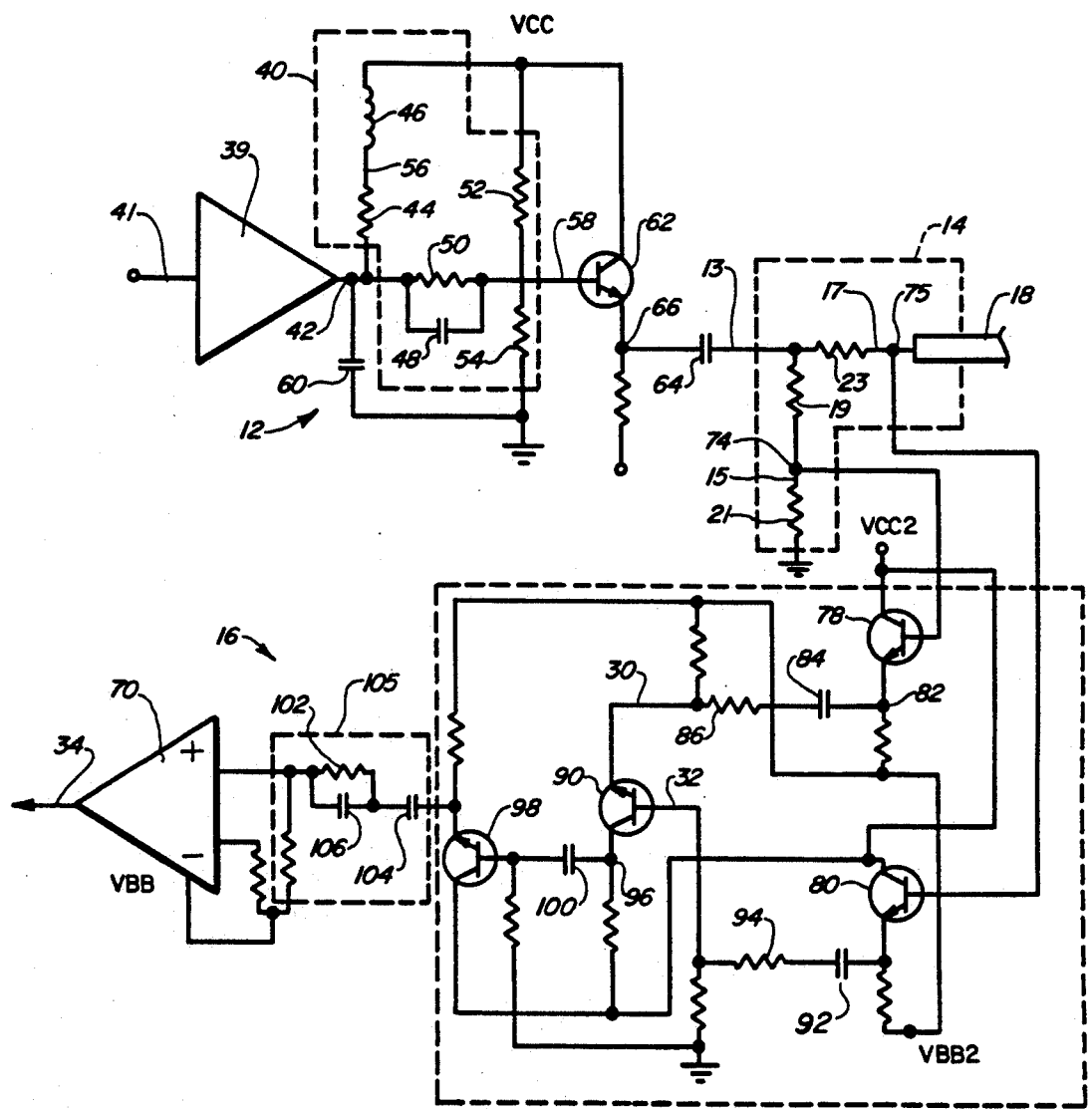
FIG. 3 is a schematic diagram of the bidirectional transceiver according to the present invention.

Turning now to FIG. 3, therein is shown the circuit implementation for the present invention corresponding to the first transceiver 10 shown in FIG. 2. According to FIG. 3, emitter coupled logic (ECL) data appears at an input 41 of a buffering means 39 which supplies an output current at a terminal 42. The signal is thereafter applied to a first pre-emphasis or equalizing network 40. Equalizing network 40 is formed by a resistor 44, an inductor 46, a first capacitor 48, a second resistor 50, a third resistor 52 and a fourth resistor 54. Resistor 44 has its terminals connected between buffering output terminal 42 and terminal 56, which also provides a terminal for inductor 46 whose other terminal is connected to a positive voltage source. Resistor 50 has its terminals connected between terminal 42 and terminal 58 as does capacitor 48. Resistor 52 is connected between the positive voltage source and terminal 58 and resistor 54 has its terminals connected between terminal 58 and ground.

The equalizing network 40 emphasizes the high frequency components and attenuates the low frequency components of the signal supplied at terminal 42. Pre-emphasis network 40 contributes to one half of the total required equalization for transceiver 10. The amount is both a function of the cable characteristics and the length. Ideally, the equalizer transfer function is the inverse of the coaxial cable's transfer function over the full operating frequency spectrum and independent of length.

Primary functions of the equalizer circuit 40 are to provide compensation for the envelope delay and amplitude distortion in the coaxial cable 18. These distortions may be defined for the media in use at a length and compensated in the equalizer circuit 40. For operation at different lengths, a nominal value may be assumed for the equalizer circuit 40. Equalization network 40 uses a pole/zero cancellation technique provided by capacitor 48 and inductor 46 to provide compensation for the zero/pole characteristic of the cable over the fundamental frequency range at a given length. Of course, different values of the components in pre-emphasis network 40 may be used to provide reliable bidirectional transmission at other lengths.

A capacitor 60 forms part of a low pass filter including resistors 52 and 54 to limit the upper value of the high frequency components contained in the buffer output signal at terminal 42. The signal supplied by pre-emphasis network 40 and low pass filter is thereafter supplied to the base of a low impedance driver/emitter follower transistor 62. The output taken at the emitter terminal 66 of transistor 62 is capacitively coupled to the first bridge network 14 with the use of a capacitor 64.

The first bridge network 14 comprises a first branch 15 including a first resistor 19, a second resistor 21, and a second branch including a third resistor 23, and the transmission impedance characteristic of coaxial cable 18. In the first branch 15, resistor 19 has its terminals connected between terminal 13 and terminal 74. Resistor 21 has its terminals connected between node 74 and ground. The second branch 17 of the bridge network 14 comprises resistor 23 having its terminals connected between terminals 13 and 75. Coaxial cable 18 provides the second half of the second branch 17 and has its signal carrying conductor connected to terminal 75. The values of resistor 19, resistor 21 and resistor 23 are chosen to be equivalent to the transmission line impedance of coaxial cable 18. Thus, a signal supplied by the first transmitter section 12 is applied across each resistor of branches 15 and 17 of the bridge network 14, resulting in a cancelling signal output voltage appearing at terminal 74 approximately one half of the signal at output terminal 13 from transistor 62. One component of a combined signal at terminal 75 corresponds to this same voltage level.

An incoming signal supplied by coaxial cable 18 and intended to be passed by receiver 16 as data encounters an effective impedance approximately equal to the resistance of resistor 23 as its terminating impedance since the emitter follower stage of transistor 62 appears as a low impedance. The incoming signal provides the other component for the combined signal appearing at terminal 75.

The cancelling signal developed at terminal 74 is thereafter applied to the base of an emitter follower transistor 78. Similarly, the combined output signal developed at terminal 75 is applied to a matched emitter follower transistor 80. Transistors 78 and 80 provide buffering for the cancelling and combined signals. The output taken from the emitter of transistor 78 at a terminal 82 is thereafter coupled with a capacitor 84 and a resistor 86 and applied to the emitter of a single staged subtracting amplifier 90. The output developed at the emitter of transistor 80 is coupled to the base of transistor 90 through capacitor 92 and resistor 94.

Transistor 90 is used as a single stage subtracting amplifier as opposed to a differential stage amplifier to reliably obtain the difference between the cancelling and the combined signals at high data transmission rates. The cancellation of the transmit energy in the receiver section 16 is dependent on the amplitude and phase of the signal components at the subtracting transistor 90. The amplitude and phase of these signals are dependent on the magnitude and phase of the impedances in the bridge network 14 including the transmission line impedance and the impedance of the emitter follower transistors 78 and 80. To achieve maximum cancellation, the cancelling signal and the component of the combined signal supplied by the first transmitter section 12 must be supplied to transistor 90 at the same time. Transistor 90 must also process the signals within a relatively short time. Further, a relatively high rejection ratio, for example, approximately 28 decibels (dB), must be maintained at a data transmission rate well over 125 megabits per second. Preferably, a type 2N6604 transistor having a small capacitance between its base and collector and operative at high frequencies may be used.

It has been found that mistimed arrival of the cancelling signal and the component of the combined signal supplied by first transmitter 12 causes noncancellation and transient noise to occur at the receiver output resulting in poor performance. The amplitude of these noise spikes severely limits the distance between complementary transceivers since the amplitude of the minimum incoming signal falls below the required signal to noise ratio defined by the FDDI standard.

The resulting output voltage achieved at the collector of transistor 90 at terminal 96 is the difference between the cancelling signal and the combined signal. This output signal is again capacitively coupled to an emitter follower transistor 98 with the use of a capacitor 100.

An emitter follower transistor 98 thereafter drives a receiver equalizing circuit 105 formed by resistor 102, a first capacitor 104 and a second capacitor 106. The transmitter and receiver equalizing circuits 40 and 105, when taken together, form an equalization network that compensates for the transfer function characteristic of coaxial cable 18. Pre-emphasis network 40 contributes to one half of the total required equalization for transceiver 10 and equalizing network 105 contributes the other half. Splitting of the equalizer into two sections reduces the level of radiated transmissions while improving the signal-to-noise ratio.

The output of the equalizing network is then applied to a high gain comparator stage 70 and is ready for output as ECL received data. A data output at a line 34 indicates that the received signal is of sufficient amplitude and duration to be considered valid data. It has been found that an energy detector (not shown) of the type that is known in the art may be coupled with the output of the receiver to ensure that the transceiver is completely compatible with its fiber optic counterpart.

Figure 4:
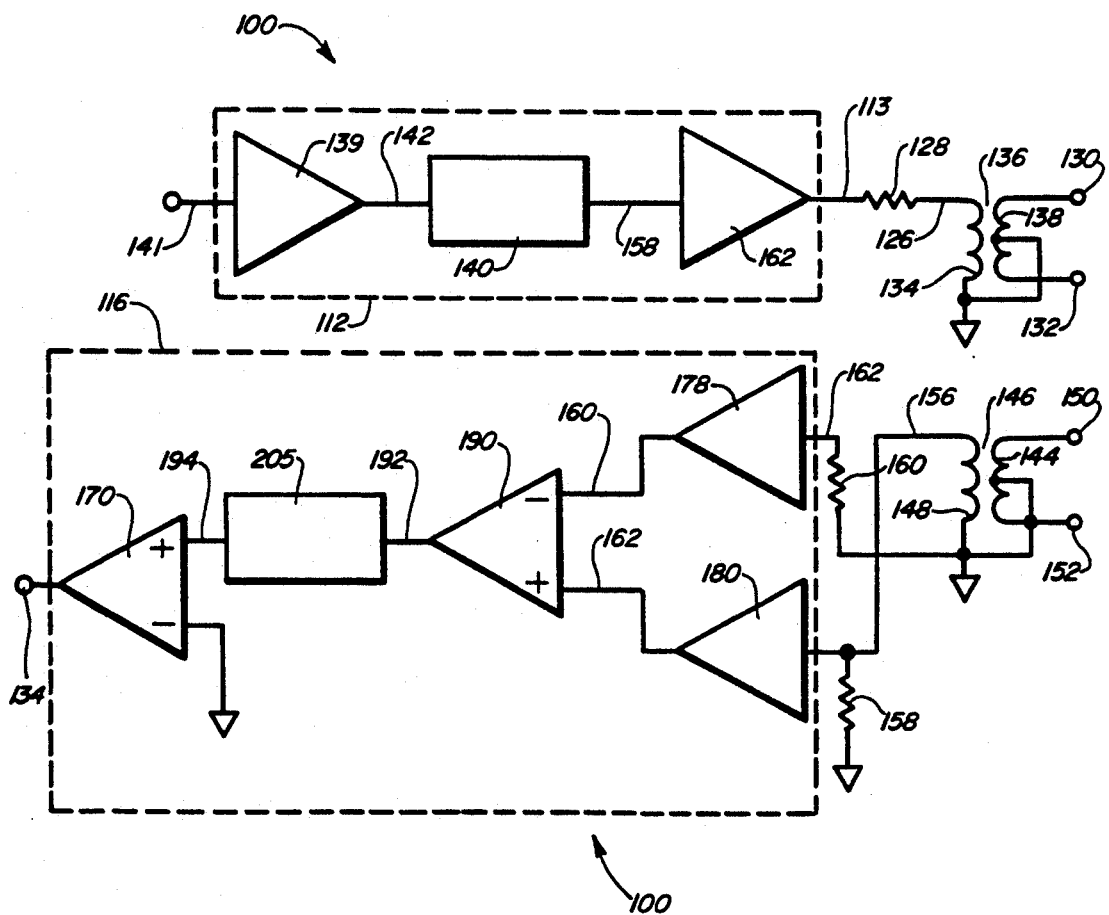
FIG. 4 is a block diagram representation of an alternative embodiment of the present invention providing a particular application for twisted pair media.

Referring now to FIG. 4, therein is shown a modification of the present invention to provide for transmission of FDDI data over twisted pairs of wires. The invention provides for bidirectional transmission over two pairs of twisted wires for transcarrying FDDI data. A transceiver 100 for interfacing twisted pair media in an FDDI network includes a transmitter section 112 comprising an input buffering means 139, an equalizing circuit 140 and a second buffer 162. The component types, values and function of input buffering means 139, equalizing circuit 140 and second buffer 162 correspond to the input buffering means 39, the equalizing circuit 40 and the emitter/follower transistor 62 described in connection with the transmitter section 12 of FIG. 3. An input signal appearing as ECL coded data at input terminal 141 is provided as an output current at a line 142. The signal is applied to an equalizing network 140 and to the second input buffer 162 via a line 158. The buffer output signal at line 113 is applied through a resistor 128 whose value is chosen to match the impedance of the twisted pair and thereafter to a first input terminal of a primary winding 134 of a transformer 136. The second input terminal 134 of transformer 136 is connected to ground.

The secondary winding 138 has its center grounded to obtain differential voltage signals between output terminals 130 and 132 characteristic of the ECL data signal provided to the input of the transmitter section at line 141. The leads of a twisted pair cable are connected to output terminals 130 and 132 and provide the transmission media for the high speed data supplied by transmitter section 112.

Transceiver 100 also includes a receiver section 116 comprising two buffers 178 and 180, a subtracting transistor 190, an equalizing circuit 205 and an output driver 170. The component types, values and function of buffers 178 and 180, transistor 190, equalizing circuit 205 and output driver 170 corresponding to matched emitter follower transistors 78 and 80, transistor 90, equalizing circuit 105 and output driver 70 of the bidirectional transceiver of FIG. 3.

At the signal receiving end, a twisted pair of conductors carrying FDDI data are applied to first and second terminals 150 and 152 of the primary winding 144 of a second transformer 146 having its center grounded. One output terminal 156 of the secondary winding 148 of transformer 146 develops a voltage signal across a resistor 158 that is applied to the input of buffer 180. Buffer 178 has its input terminal 162 grounded through a resistor 160. The values of resistors 158 and 160 are chosen to be the same to provide symmetrical temperature compensation and offset characteristics for buffers 178 and 180 and also to match the terminal impedance of the twisted pair transmission line. The output of buffer 178 is applied at a line 160 to the emitter of transistor 190. The output of buffer 180 is likewise applied to the base of transistor 190 to provide an output signal at a line 192. The output signal is thereafter applied to equalizing circuit 205 and to the input of driver 170. As with the coaxial transceiver 10, transceiver 100 provides ECL data at line 134 that is fully compatible with FDDI standards.

A novel transceiver for use in high speed data networks has therefore been described. The transceiver allows the replacement of a pair of fiber optic cables with a single coaxial cable and allows simultaneous bidirectional transmission at FDDI rates. Similarly, a transceiver for replacing fiber optic cables with twisted pair media has been described that operates similar to the coaxial transceiver but requires two pairs of wires for bidirectional data communication.

What is claimed is:

1. A transceiver circuit connecting a fiber optic medium and a short data link comprising a coaxial conductor in a high speed data transmission network for simultaneously receiving and transmitting data over said coaxial conductor comprising:

a transmitter section for receiving data from said fiber optic medium and for supplying a transmitted data signal;

an impedance network coupled to said transmitter section and having first second and third output terminals, said impedance network receiving said transmitted data signal and providing a component of said transmitted data signal at said first output terminal connected to said coaxial conductor and providing a cancelling signal output having a component of said transmitted data signal at said second output terminal:

said impedance network receiving a data signal over said coaxial conductor and providing a combined signal output having a component of said transmitted data signal and said received data signal at said third output terminal;

a receiver section comprising a high speed subtracting circuit having a single stage subtracting transistor means with a first input terminal coupled with said second output terminal of said impedance network for receiving said cancelling signal output and a second input terminal coupled with said third output terminal of said impedance network for receiving said combined signal output and providing said received data signal as an output.

2. The transceiver circuit of claim 1, wherein said subtracting transistor has a small capacitance between its base and collector junction.

3. A pair of transceiver circuits for providing a link between a data unit and a fiber optic medium via a coaxial conductor in a high speed fiber optic data transmission network and for simultaneously receiving and transmitting data over said coaxial conductor comprising:

first transmitter circuit means coupled with said fiber optic medium for receiving data therefrom and for supplying a first transmitted data signal;

a first impedance network coupled to said first transmitter circuit means having first, second and third output terminals;

said first impedance network receiving said first transmitted data signal and providing a component of said first transmitted data signal at said first output terminal connected to said coaxial conductor and providing a first cancelling signal output having a component of said first transmitted data signal at said second output terminal;

said impedance network receiving a component of a second transmitted data signal over said coaxial conductor and providing a first combined signal output having a component of said first transmitted data signal and said second transmitted data signal at said third output terminal;

first receiver circuit means including first high speed single stage subtracting transistor means having a first input terminal for receiving said first cancelling signal output and a second input terminal for receiving said first combined signal output and providing said component of said second transmitted data signal at an output terminal;

second transmitter circuit means coupled with the data unit for receiving data therefrom and for supplying a second transmitted data signal;

a second impedance network coupled to said second transmitter circuit means having first, second and third output terminals;

said second impedance network receiving said second transmitted data signal and providing a component of said second transmitted data signal at said first output terminal connected to said coaxial conductor and providing a second cancelling signal output having a component of said transmitted data signal at said second output terminal;

said second impedance network receiving said component of said first transmitted data signal over said coaxial conductor and providing a second combined signal output having a component of said second transmitted data signal and said first transmitted data signal at said third output terminal; and second receiver circuit means including second high speed single stage subtracting transistor means having a first input terminal for receiving said second cancelling signal output and a second input terminal for receiving said second combined signal output and providing said component of said first transmitted data signal at an output terminal.

4. A pair of transceiver circuits for providing a link between a data unit and a fiber optic medium via a coaxial conductor in a high speed fiber optic data transmission network and for simultaneously receiving and transmitting data over said coaxial conductor comprising:

first transmitter circuit means coupled with the fiber optic medium for receiving data therefrom and for supplying a first transmitted data signal;

first equalizing circuit means receiving said first transmitted data signal from said first transmitter circuit means and providing a first equalized transmitted data signal;

a first impedance network coupled to said first equalizing circuit means having first, second and third output terminals;

said first impedance network receiving said first equalized transmitted data signal and providing a component of said first equalized transmitted data signal at said first output terminal connected to said coaxial conductor and providing a first cancelling signal output having a component of said first equalized transmitted data signal at said second output terminal;

said impedance network receiving a component of a second equalized transmitted data signal over said coaxial conductor and providing a combined signal output having a component of said first equalized transmitted data signal and said second equalized transmitted data signal at said third output terminal;

first receiver circuit means including first high speed single stage subtracting transistor means having a first input terminal for receiving said first cancelling signal output and a second input terminal for receiving said first combined signal output and providing said component of said second equalized transmitted data signal at an output terminal;

second equalizing circuit means coupled with said output terminal of said first transistor for receiving said component of said second equalized transmitted data signal from said first subtracting transistor means and providing a first equalized output data signal;

second transmitter circuit means coupled with the data unit for receiving data therefrom and for supplying a second transmitted data signal;

third equalizing circuit means for receiving said second transmitted data signal from said second transmitter circuit means and providing said second equalized transmitted data signal;

a second impedance network coupled to said second equalized transmitted data signal and having first, second and third output terminals;

said second impedance network receiving said second equalized transmitted data signal and providing a component of said second equalized transmitted data signal at said first output terminal connected to said coaxial conductor and providing a second cancelling signal output having a component of said second equalized transmitted data signal at said second output terminal;

said second impedance network receiving said component of said equalized first transmitted data signal over said coaxial conductor and providing a second combined signal output having a component of said second equalized transmitted data signal at said third output terminal;

second receiver circuit means including second high speed single stage subtracting transistor means having a first input terminal for receiving said second cancelling signal output and a second input terminal for receiving said second combined signal output and providing said first equalized transmitted data signal at an output terminal;

fourth equalizing circuit means coupled with said output terminal of said second transistor for receiving a component of said first equalized transmitted received data signal from second subtracting transistor means and providing a second equalized output data signal to the data unit.

* * * * *